(12) United States Patent
Wu et al.

(10) Patent No.: US 8,693,769 B2
(45) Date of Patent: Apr. 8, 2014

(54) IMAGE CLASSIFICATION METHODS AND SYSTEMS

(75) Inventors: Cheng-Feng Wu, Chiayi County (TW); Te-Chin Shao, Taichung (TW); Wen-Chao Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 570 days.

(21) Appl. No.: 12/648,184

(22) Filed: Dec. 28, 2009

(65) Prior Publication Data

US 2011/0158516 A1    Jun. 30, 2011

(51) Int. Cl.
    *G06K 9/00*    (2006.01)
(52) U.S. Cl.
    USPC ........... 382/165; 382/164; 382/199; 382/295; 382/225
(58) Field of Classification Search
    USPC ..................... 382/165, 164, 199, 295, 225
    See application file for complete search history.

(56) References Cited

U.S. PATENT DOCUMENTS

| | | | |
|---|---|---|---|
| 5,754,676 A | 5/1998 | Komiya et al. | |
| 5,787,201 A | 7/1998 | Nelson et al. | |
| 6,067,376 A | 5/2000 | Li | |
| 6,480,627 B1 | 11/2002 | Mathias et al. | |
| 6,512,846 B1 * | 1/2003 | Luo | 382/165 |
| 6,947,597 B2 | 9/2005 | Lin et al. | |

OTHER PUBLICATIONS

Schettini at al: "Automatic classification of digital photographs based on decision forests", Intl. J. of Pattern Recognition and Artificial intelligences, 2004.*
Yanni Wang et al, "Hierarchical Image Classification Using Support Vector Machines," ACCV2002: The 5th Asian Conference on Computer Vision, Jan. 23-25, 2002, Melbourne, Australia.
Sebastiano Battiato et al, "Smart Photo Sticking," Adaptive Multimedial Retrieval: Retrieval, User, and Semantics, 5th International Workshop, Jul. 2008, pp. 211-223, Paris, France.

* cited by examiner

*Primary Examiner* — Ruiping Li

(57) ABSTRACT

Image classification methods and systems are provided. First, an image is obtained using a computer. The image is then processed using the computer to obtain image information. The image information includes one or any combination of an average color difference between at least one average channel value of pixels in at least one boundary region of the image and a predefined standard value, a gradient variation magnitude difference between at least two regions of the image, and a percentage of the edges of the image to the image. The image is classified using the computer according to the image information.

16 Claims, 9 Drawing Sheets

IMAGE CLASSIFICATION METHODS AND SYSTEMS

BACKGROUND

1. Technical Field

The disclosure relates generally to image classification methods and systems, and, more particularly to methods and systems that obtain image information from an image, and accordingly classify the image into different types of images.

2. Description of the Related Art

Image capture devices such as cameras or camcorders are popular. Users can use image capture devices to capture images in a variety of ways. For example, landscape image images may be captured by users who appreciate nature, and close-up image images may be captured by users wanting portrait images. Currently, image capture devices are digitized, such that users can capture digital images conveniently. Since a large amount of images can be easily captured, the storage and classification of the images may be a time-consuming and inconvenient process for users.

BRIEF SUMMARY

Image classification methods and systems are provided.

In an embodiment of an image classification method, an image is obtained using a computer. The image is then processed using the computer to obtain image information. The image information includes one or any combination of an average color difference between at least one average channel value of pixels in at least one boundary region of the image and a predefined standard value, a gradient variation magnitude difference between at least two regions of the image, and a percentage of the edges of the image to the image. The image is classified using the computer, according to the image information.

An embodiment of an image classification system includes a storage unit (e.g., a non-transitory storage unit) and a processing unit coupled with the storage unit. The storage unit includes an image. The processing unit processes the image to obtain image information. The image information includes one or any combination of an average color difference between at least one average channel value of pixels in at least one boundary region of the image and a predefined standard value, a gradient variation magnitude difference between at least two regions of the image, and a percentage of the edges of the image to the image. The processing unit classifies the image according to the image information.

In some embodiments, the image is determined as a landscape image when the average color difference is less than a first predefined threshold, when the gradient variation magnitude difference is less than a second predefined threshold, or when the percentage of the edges of the image to the image is greater than a third predefined threshold, and the image is determined as a close-up image when the average color difference is not less than the first predefined threshold, when the gradient variation magnitude difference is not less than the second predefined threshold, or when the percentage of the edges of the image to the image is not greater than the third predefined threshold.

In some embodiments, a weighting is respectively applied to the average color difference, the gradient variation magnitude difference, and the percentage of the edges of the image to the image, and the image is classified according to one or any combination of the average color difference, the gradient variation magnitude difference, and the percentage of the edges of the image to the image with the corresponding weightings.

Image classification methods may take the form of a program code embodied in a tangible media. When the program code is loaded into and executed by a machine, the machine becomes an apparatus for practicing the disclosed method.

BRIEF DESCRIPTION OF THE DRAWINGS

The disclosure will become more fully understood by referring to the following detailed description with reference to the accompanying drawings, wherein.

DETAILED DESCRIPTION

Image classification methods and systems are provided.

Figure 1:
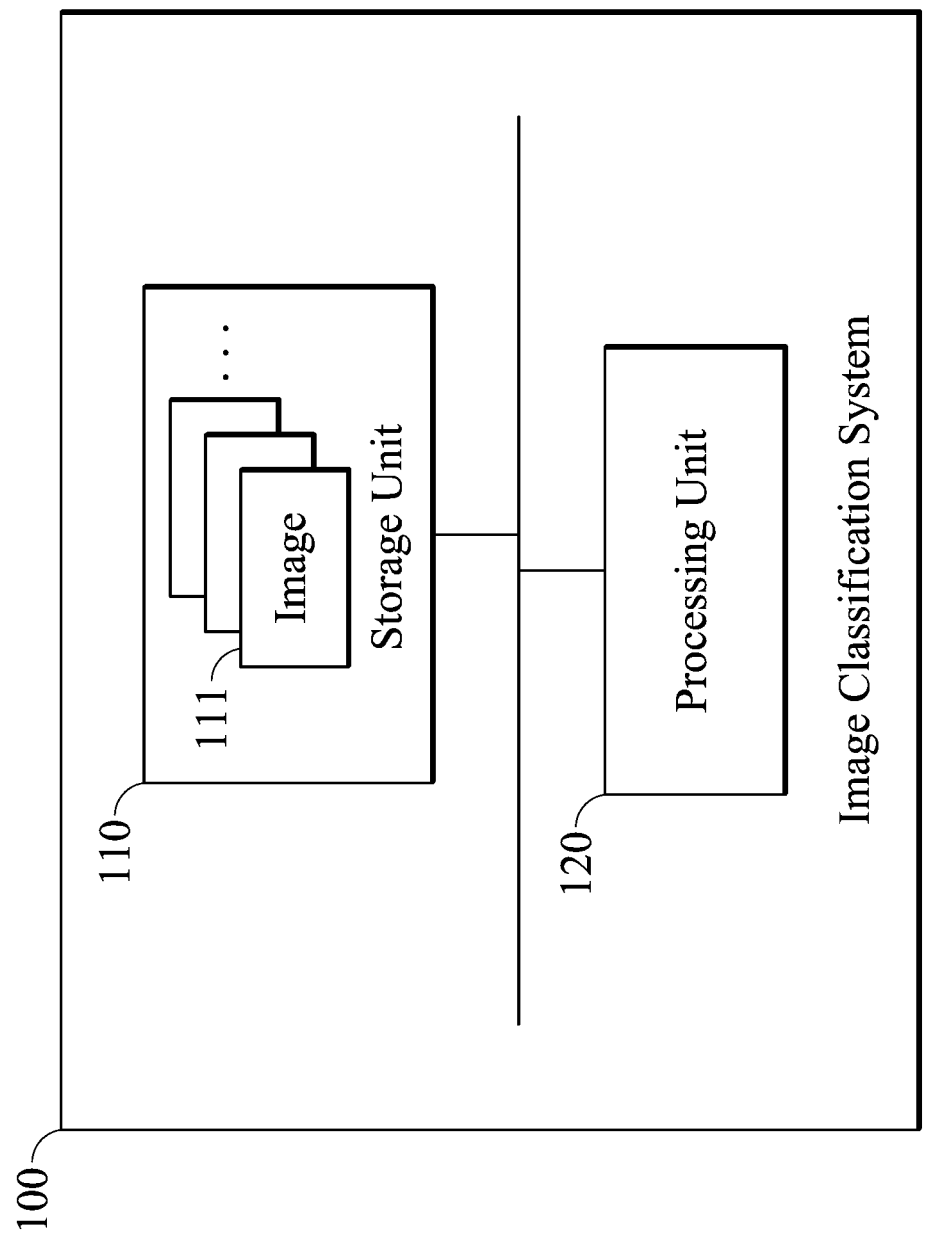
FIG. 1 is a schematic diagram illustrating an embodiment of an image classification system of the disclosure.

FIG. 1 is a schematic diagram illustrating an embodiment of an image classification system of the disclosure. The image classification system 100 may be a processor-based electronic device, such as a computer.

The image classification system 100 comprises a storage unit 110 and a processing unit 120. The storage unit 110 is coupled with the processing unit 120 can store at least one image 111. The processing unit 120 performs the image classification method of the disclosure, which will be discussed further in the following paragraphs.

Figure 2:
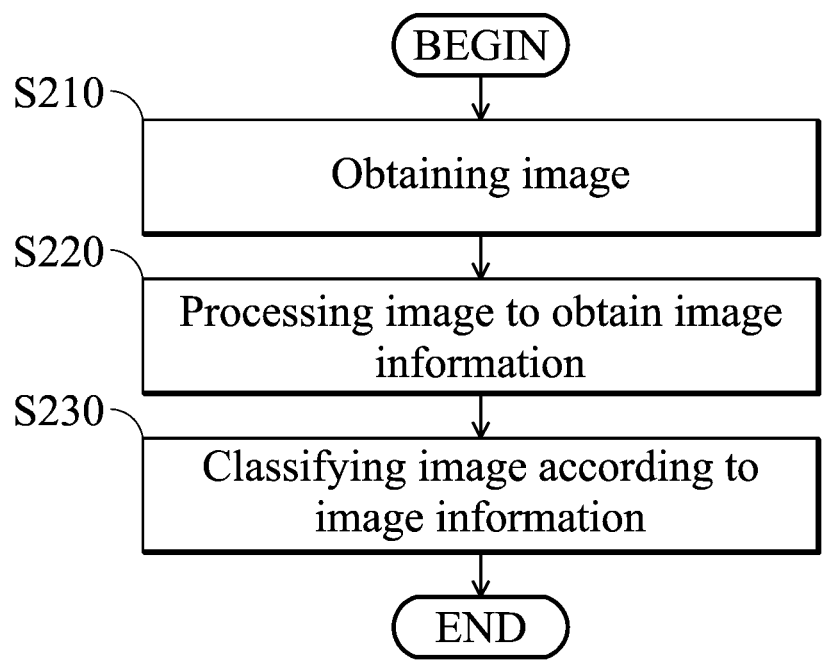
FIG. 2 is a flowchart of an embodiment of an image classification method of the disclosure.

FIG. 2 is a flowchart of an embodiment of an image classification method of the disclosure. The image classification method can be used in a processor-based electronic device, such as a computer.

In step S210, an image is obtained using the computer. In step S220, the image is processed, using the computer, to obtain image information. It is noted that, the image information can be used to classify the image. In some embodiments, the image information can comprise one or any combination of an average color difference between at least one average channel value of pixels in at least one boundary region of the image and a predefined standard value, a gradient variation magnitude difference between at least two regions of the image, and a percentage of the edges of the image to the image. In step S230, the image is classified, using the computer, according to the image information.

Figure 3:
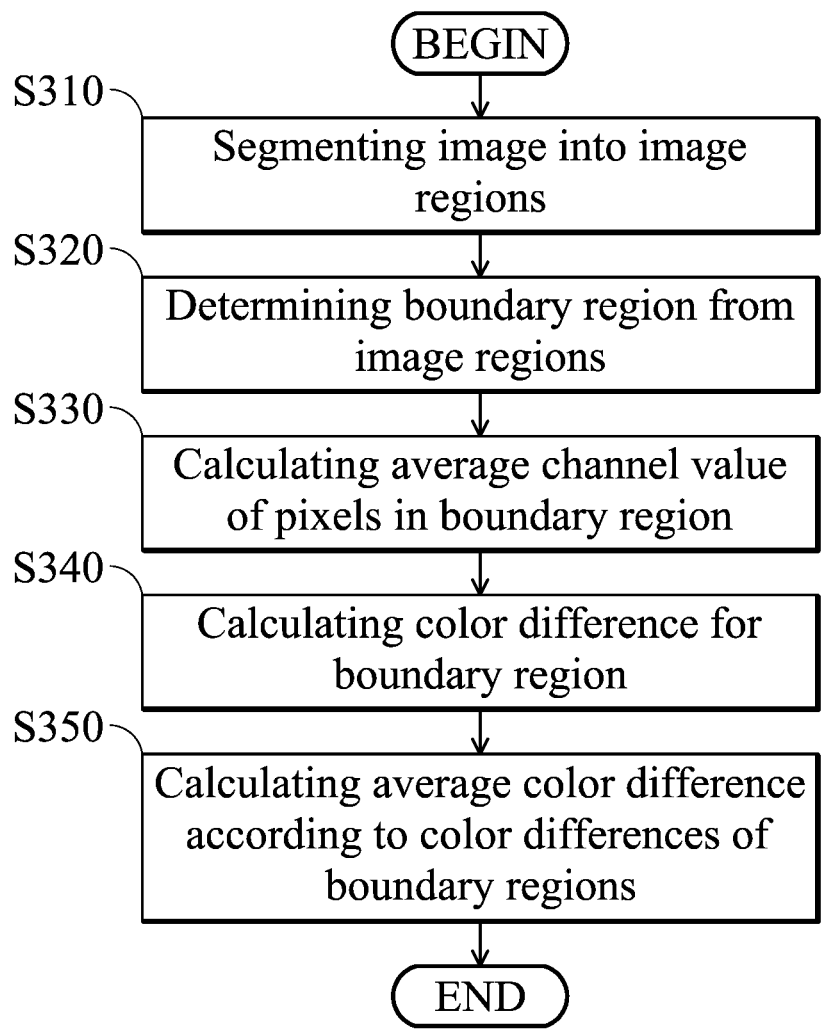
FIG. 3 is a flowchart of an embodiment of a method for calculating image information of the disclosure.

FIG. 3 is a flowchart of an embodiment of a method for calculating image information of the disclosure. In this embodiment, the image information is the average color difference.

In step S310, the image is segmented, using an image segmentation method, into a plurality of image regions. In some embodiments, the image segmentation method may comprise an edge detection method, a thresholding method, a region growing method, and others. It is understood that, the image segmentation method is an example of the disclosure, and any image segmentation method can be applied in the disclosure. In step S320, at least one boundary region is determined from the image regions. It is noted that, each boundary region may connect to an upper or lower boundary of the image. In step S330, an average of at least one channel value, such as R, G, and/or B channel value of pixels in each boundary region is calculated, and in step S340, a color difference between the average channel value of pixels in each boundary region and a predefined standard value is calculated. It is understood that, in some embodiments, the boundary region can be classified into an upper boundary region or a lower boundary region, and the predefined standard values defined for the upper and lower boundary regions are different. For example, the predefined standard value defined for the upper boundary region may be a value representing blue, and the predefined standard value defined for the lower boundary region may be a value representing green. In step S350, an average color difference is calculated according to the color differences corresponding to the boundary regions.

Figure 4:
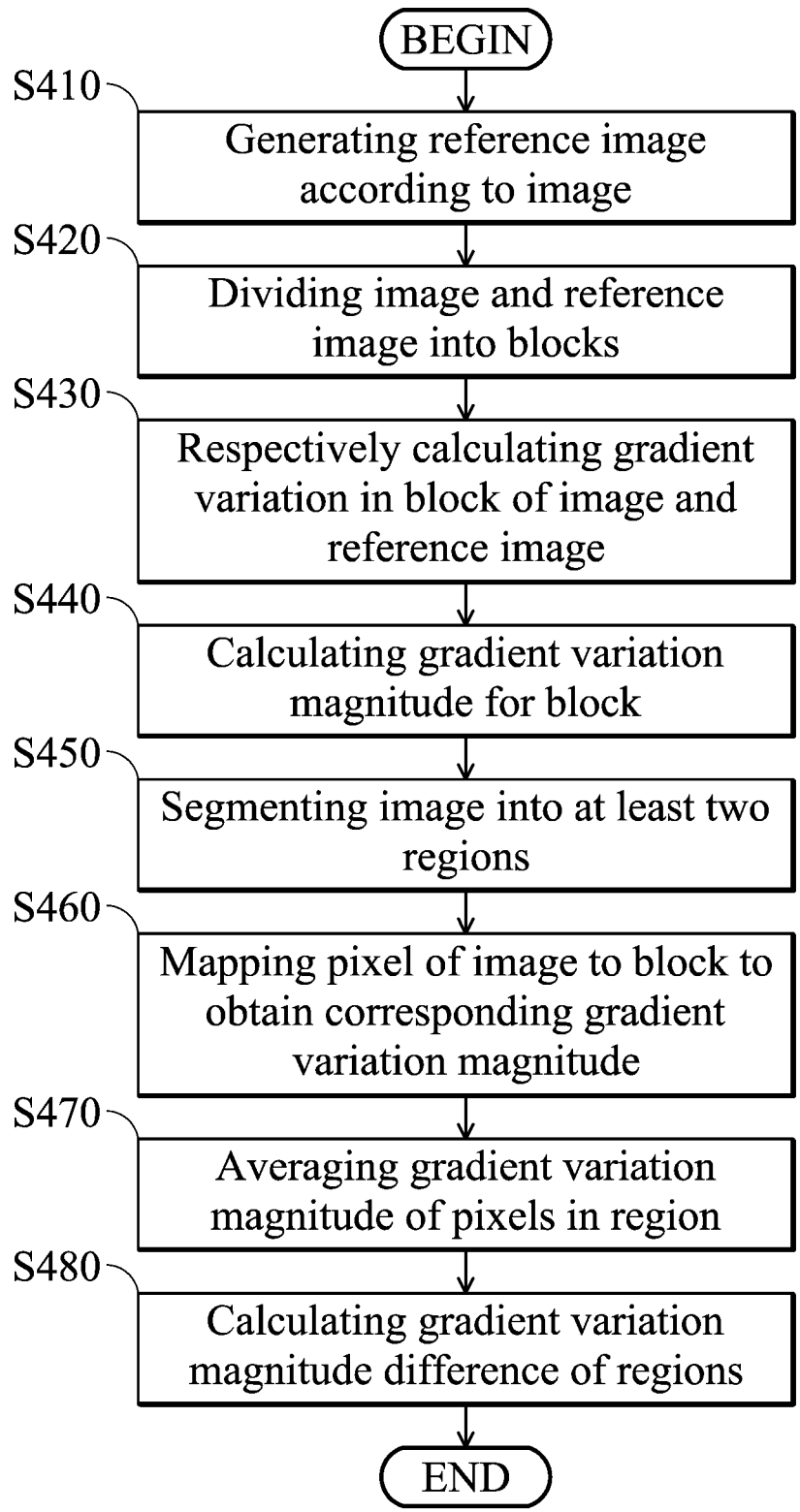
FIG. 4 is a flowchart of another embodiment of a method for calculating image information of the disclosure.

FIG. 4 is a flowchart of another embodiment of a method for calculating image information of the disclosure. In this embodiment, the image information is the gradient variation magnitude difference.

In step S410, a reference image is generated according to the image. In some embodiments, the luminance of image space of the image can be used to generate the reference image. In some embodiments, a low-pass filter can be applied to the image, such as a Gaussian filter, or an average mask can be applied to the image to perform convolution, to generate the reference image. In step S420, the image and the reference image are respectively divided into a plurality of blocks. In step S430, a gradient variation in each block of the image and the reference image are respectively calculated, and in step S440, a gradient variation magnitude for each block is calculated according to the gradient variation of the corresponded blocks respectively in the image and the reference image.

The gradient variation magnitude is calculated as follows. It is assumed that I is the image, R is the reference image, I(i,j) is the gray value of pixel (i,j) of the image I, R(i,j) is the gray value of pixel (i,j) of the reference image R, and the block size is m*n, where i, j, m, n, are positive integers. The gradient variation in each block of the image and the reference image are respectively calculated as follows:

$D\_Ihor(i,j)=Abs(I(i,j)-I(i-1,j))$, for $i=1$ to $m-1$, $j=0$ to $n-1$;

$D\_Iver(i,j)=Abs(I(i,j)-I(i,j-1))$, for $j=1$ to $n-1$, $i=0$ to $m-1$;

$D\_Rhor(i,j)=Abs(R(i,j)-R(i-1,j))$, for $i=1$ to $m-1$, $j=0$ to $n-1$; and $D\_Rver(i,j)=Abs(R(i,j)-R(i,j-1))$, for $j=1$ to $n-1$, $i=0$ to $m-1$, wherein the D_Ihor is the horizontal gradient variation of pixel (i,j) of image I, D_Iver is the vertical gradient variation of pixel (i,j) of image I, D_Rhor is the horizontal gradient variation of pixel (i,j) of image R, and D_Rver is the vertical gradient variation of pixel (i,j) of image R.

The horizontal and vertical gradient variation magnitude of each pixel is calculated as follows:

$D\_Vver(i,j)=Max(0,D\_Iver(i,j)-D\_Rver(i,j))$ for $i=1$ to $m-1$, $j=1$ to $n-1$; and $D\_Vhor(i,j)=Max(0,D\_Ihor(i,j)-D\_Rhor(i,j))$ for $i=1$ to $m-1$, $j=1$ to $n-1$.

Then, the horizontal and vertical block gradient variation magnitude is calculated as $$s\_Vver = \sum_{i,j=1}^{m-1,n-1} D\_Vver(i,j), \text{ and } s\_Vhor = \sum_{i,j=1}^{m-1,n-1} D\_Vhor(i,j),$$

and the horizontal and vertical block gradient variation magnitude can be normalized using the calculations $$s\_Iver = \sum_{i,j=1}^{m-1,n-1} D\_Iver(i,j), \text{ and } s\_Ihor = \sum_{i,j=1}^{m-1,n-1} D\_Ihor(i,j),$$

such that $$c\_Iver = \frac{s\_Vver}{s\_Iver}, \text{ and } c\_Ihor = \frac{s\_Vhor}{s\_Ihor}.$$

Finally, the gradient variation magnitude for each block is calculated as $cVar=Max(c\_Iver,c\_Ihor)$ or $cVar=\sqrt{(c\_Iver)^2+(c\_Ihor)^2}$.

Then, in step S450, the image is segmented into at least two regions. In step S460, each pixel of the image is mapped to the blocks to obtain the corresponding gradient variation magnitude, and in step S470, the gradient variation magnitudes of pixels in the respective regions are averaged. In step S480, the gradient variation magnitude difference of the regions is calculated according to the average gradient variation magnitudes of the regions.

Figure 5:
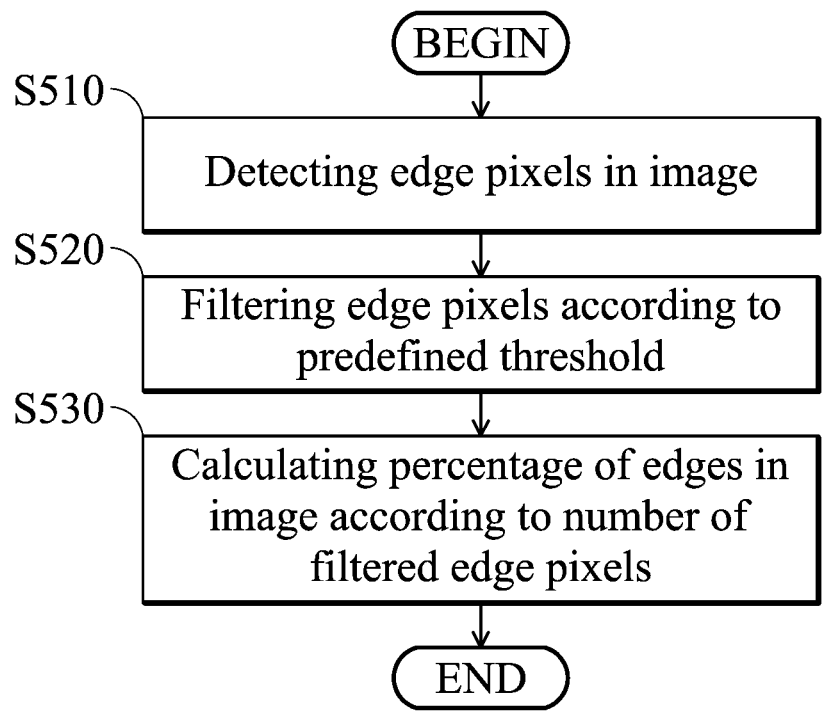
FIG. 5 is a flowchart of another embodiment of a method for calculating image information of the disclosure.

FIG. 5 is a flowchart of another embodiment of a method for calculating image information of the disclosure. In this embodiment, the image information is the percentage of the edges of the image to the image.

In step S510, edge pixels in the image are detected using an edge detection method, such as a Sobel operator. It is understood that, the edge detection method of the disclosure is not limited thereto. In step S520, the edge pixels are filtered according to a predefined threshold, such that the edge pixels have an edge magnitude greater than the predefined threshold. In step S530, the percentage of the edges of the image to the image is calculated according to the number of the filtered edge pixels and the number of pixels of the image.

It is understood that, in some embodiments, the image can be further divided into a plurality of blocks. It is determined whether the respective blocks include at least one of the edge pixels. When a block includes at least one of the edge pixels, the block is determined as an edge block, and the percentage of the edges of the image to the image is calculated according to the number of the edge blocks and the number of the blocks of the image.

Figure 6:
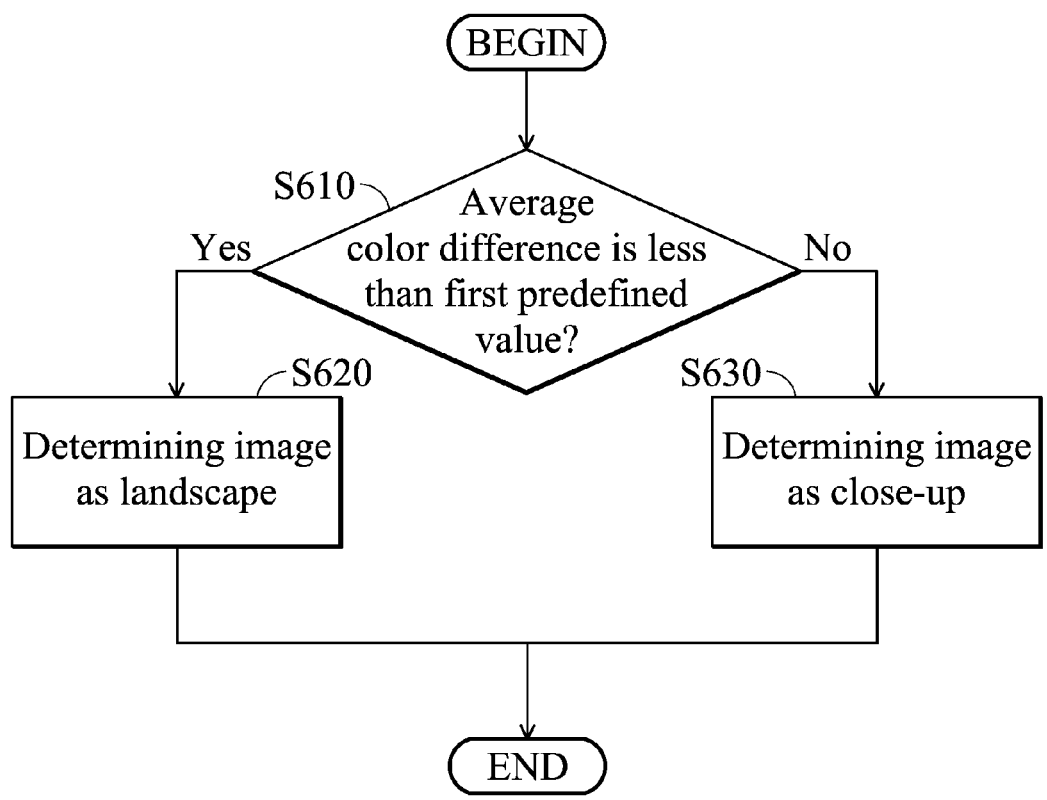
FIG. 6 is a flowchart of an embodiment of a method for classifying images using image information of the disclosure.

FIG. 6 is a flowchart of an embodiment of a method for classifying images using image information of the disclosure. In this embodiment, the image information for image classification is the average color difference.

In step S610, it is determined whether the average color difference between the average channel value of pixels in the boundary regions of the image and the predefined standard value is less than a first predefined value. When the average color difference is less than the first predefined value (Yes in step S610), in step S620, the image is determined as a landscape image. When the average color difference is not less than the first predefined value (No in step S610), in step S630, the image is determined as a close-up image.

Figure 7:
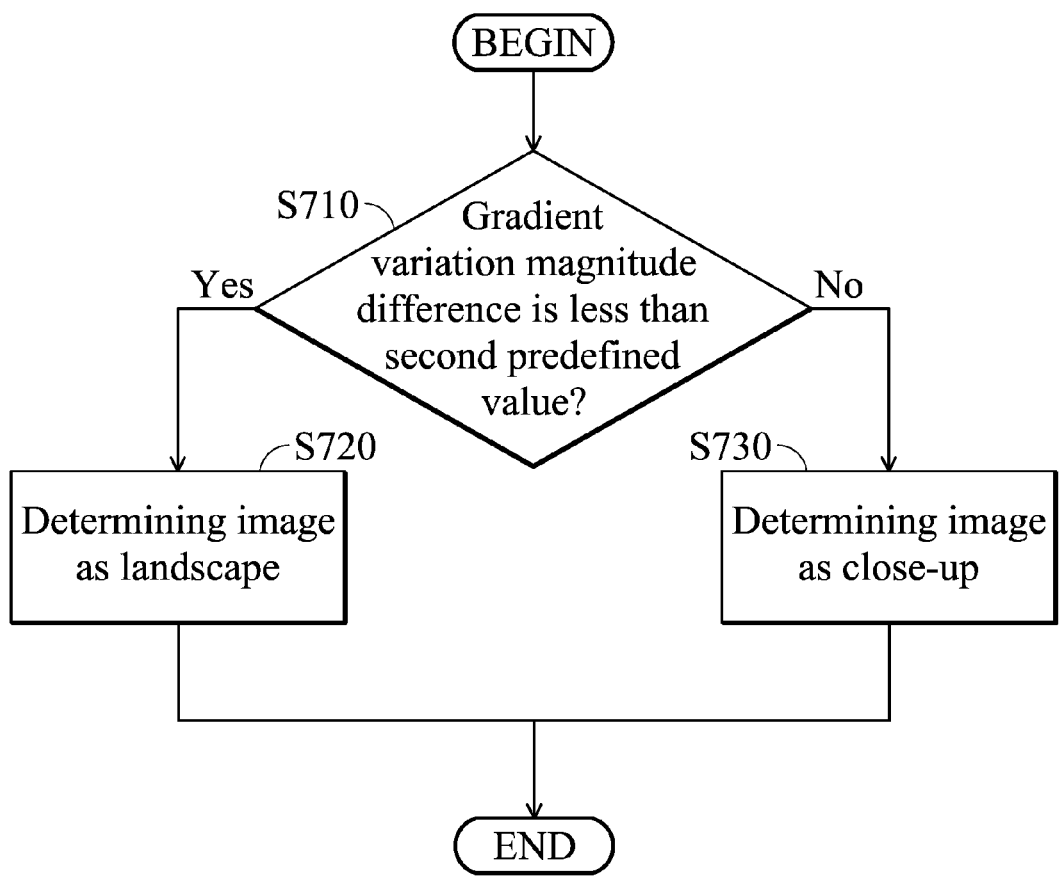
FIG. 7 is a flowchart of another embodiment of a method for classifying images using image information of the disclosure.

FIG. 7 is a flowchart of another embodiment of a method for classifying images using image information of the disclosure. In this embodiment, the image information for image classification is the gradient variation magnitude difference.

In step S710, it is determined whether the gradient variation magnitude difference between the regions of the image is less than a second predefined value. When the gradient variation magnitude difference is less than the second predefined value (Yes in step S710), in step S720, the image is determined as a landscape image. When the gradient variation magnitude difference is not less than the second predefined value (No in step S710), in step S730, the image is determined as a close-up image.

Figure 8:
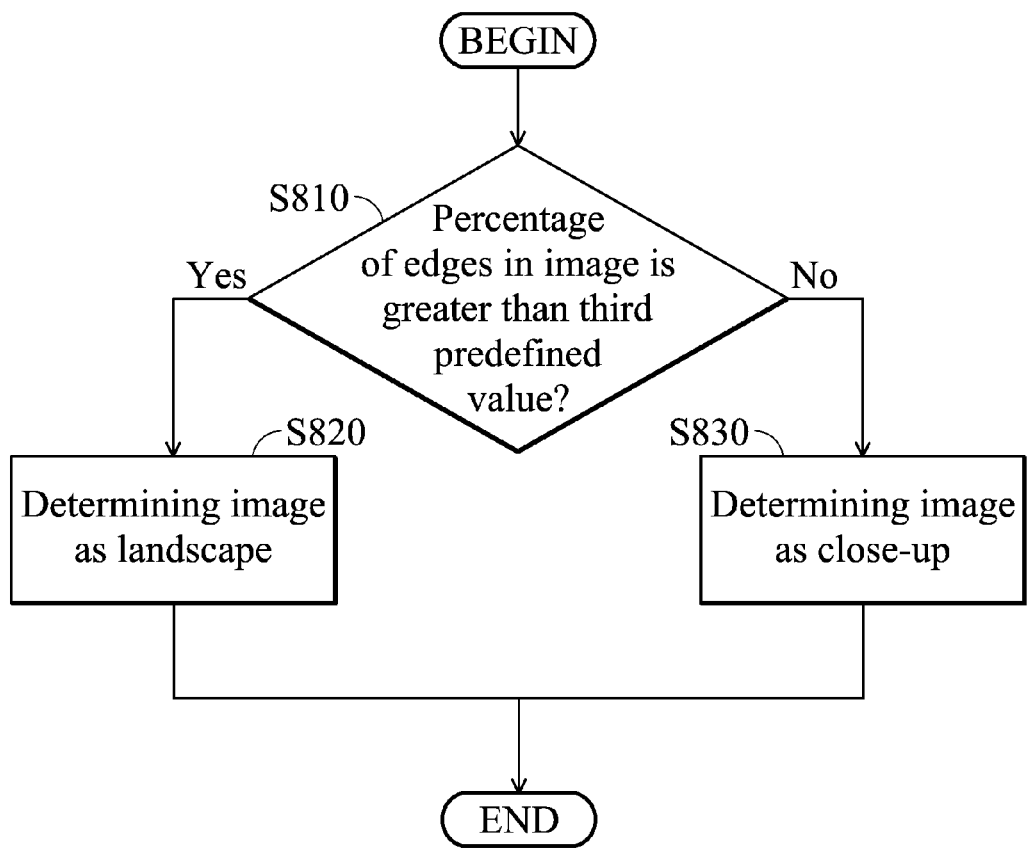
FIG. 8 is a flowchart of another embodiment of a method for classifying images using image information of the disclosure.

FIG. 8 is a flowchart of another embodiment of a method for classifying images using image information of the disclosure. In this embodiment, the image information for image classification is the percentage of the edges of the image to the image.

In step S810, it is determined whether the percentage of the edges of the image to the image is greater than a third predefined value. When the percentage of the edges of the image to the image is greater than the third predefined value (Yes in step S810), in step S820, the image is determined as a landscape image. When the percentage of the edges of the image to the image is not greater than the third predefined value (No in step S810), in step S830, the image is determined as a close-up image.

Figure 9:
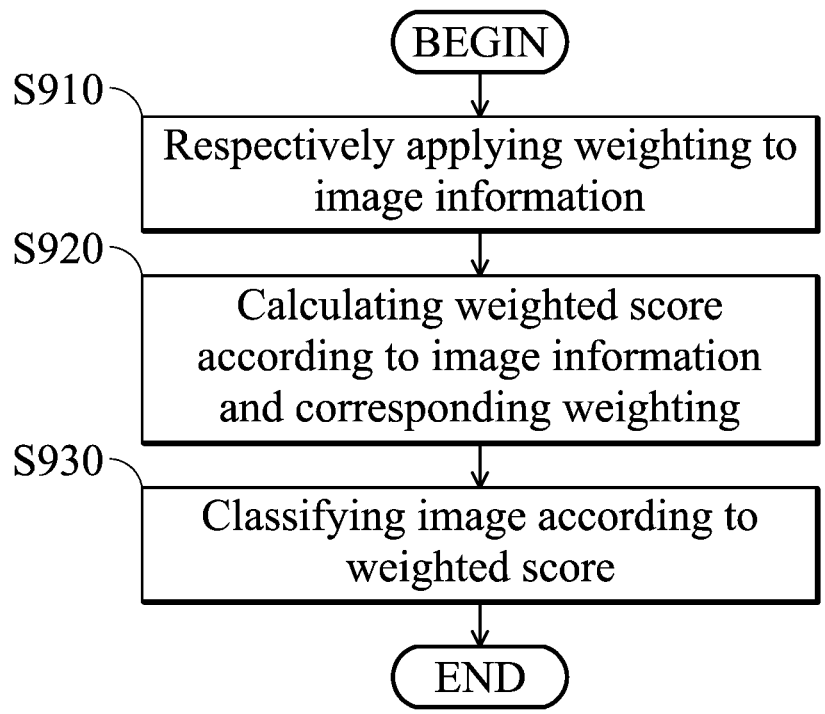
FIG. 9 is a flowchart of another embodiment of a method for classifying images using image information of the disclosure.

FIG. 9 is a flowchart of another embodiment of a method for classifying images using image information of the disclosure. In this embodiment, the image information for image classification may comprise the average color difference, the gradient variation magnitude difference, and the percentage of the edges of the image to the image.

In step S910, a weighting is respectively applied to the average color difference, the gradient variation magnitude difference, and the percentage of the edges of the image to the image. In step S920, a weighted score is calculated according to the average color difference, the gradient variation magnitude difference, and the percentage of the edges of the image to the image, and the corresponding weightings. In step S930, the image is classified according to the weighted score, whereby the image is classified into different types of images of images, such as a landscape image, a close-up image, or others.

To summarize, the image classification methods and systems of the disclosure can obtain image information, such as the average color difference, the gradient variation magnitude difference, and/or the percentage of the edges of the image to the image from an image, and accordingly classify the image into different types of images.

Image classification methods, or certain aspects or portions thereof, may take the form of a program code (i.e., executable instructions) embodied in tangible media, such as floppy diskettes, CD-ROMs, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the disclosure has been described by way of example and in terms of exemplary embodiments, it is to be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A computer-implemented image classification method executed by a computer, comprising:
   obtaining an image using the computer;
   processing the image, using the computer, to calculate a gradient variation magnitude difference between at least two regions of the image;
   determining the image is a landscape image when the gradient variation magnitude difference is less than a second predefined value; and
   determining the image is a close-up image when the gradient variation magnitude difference is not less than the second predefined value;
   wherein the gradient variation magnitude difference is calculated using the steps of:
   generating a reference image according to the image;
   dividing the image and the reference image into a plurality of blocks;
   respectively calculating a gradient variation in the respective blocks of the image and the reference image;
   calculating a gradient variation magnitude for the respective block according to the gradient variation of the corresponded blocks respectively in the image and the reference image;
   segmenting the image into two regions;
   mapping each pixel of the image to the blocks to obtain the corresponding gradient variation magnitude;
   averaging the gradient variation magnitude of pixels in the respective regions; and
   calculating the gradient variation magnitude difference of the two regions according to the average gradient variation magnitudes of the two regions.

2. An image classification device, comprising:
   a non-transitory storage unit comprising an image; and
   a processing unit coupled with the non-transitory storage unit, the processing unit processing the image to calculate a gradient variation magnitude difference between two regions of the image wherein the processing unit further determines the image is a landscape image when the gradient variation magnitude difference is less than a second predefined value and determines the image is a close-up image when the gradient variation magnitude difference is not less than the second predefined value;
   wherein the processing unit calculates the gradient variation magnitude difference by generating a reference image according to the image, dividing the image and the reference image into a plurality of blocks, respectively calculating a gradient variation in the respective blocks of the image and the reference image, calculating a gradient variation magnitude for the respective block according to the gradient variation of the corresponded blocks respectively in the image and the reference image, segmenting the image into two regions, mapping each pixel of the image to the blocks to obtain the corresponding gradient variation magnitude, averaging the gradient variation magnitude of pixels in the respective regions, and calculating the gradient variation magnitude difference of the two regions according to the average gradient variation magnitudes of the two regions.

3. An image classification program stored in a non-transitory computer readable storage medium, the program comprising instructions for causing a device to perform:
obtaining an image;
processing the image to calculate a gradient variation magnitude difference between two regions of the image; and
classifying the image according to the gradient variation magnitude difference;
wherein the gradient variation magnitude difference is calculated using the steps of:
generating a reference image according to the image;
dividing the image and the reference image into a plurality of blocks;
respectively calculating a gradient variation in the respective blocks of the image and the reference image;
calculating a gradient variation magnitude for the respective block according to the gradient variation of the corresponded blocks respectively in the image and the reference image;
segmenting the image into two regions;
mapping each pixel of the image to the blocks to obtain the corresponding gradient variation magnitude;
averaging the gradient variation magnitude of pixels in the respective regions; and
calculating the gradient variation magnitude difference of the two regions according to the average gradient variation magnitudes of the two regions.

4. The method of claim 1, further comprising:
calculating an average color difference between at least one average channel value of pixels in at least one boundary region of the image and a predefined standard value;
determining the image is the landscape image when the gradient variation magnitude difference is less than the second predefined value and the average color difference is less than a first predefined value; and
determining the image is the close-up image when the gradient variation magnitude difference is not less than the second predefined value and the average color difference is not less than the first predefined value.

5. The method of claim 4, wherein the average color difference is calculated using the steps of:
segmenting the image into a plurality of image regions;
determining at least one boundary region from the image regions, wherein the at least one boundary region comprises an upper or lower boundary of the image;
calculating at least one average channel value of pixels in the at least one boundary region;
calculating a color difference between the average channel value of pixels in the respective boundary region and the predefined standard value; and
calculating the average color difference according to the color differences corresponding to the at least one boundary region.

6. The method of claim 4, further comprising:
calculating a percentage of edges of the image to the image;
determining the image is the landscape image when the average color difference is less than the first predefined value, when the gradient variation magnitude difference is less than the second predefined value, and when the percentage of the edges of the image to the image is greater than a third predefined value; and
determining the image is a close-up image when the average color difference is not less than the first predefined value, when the gradient variation magnitude difference is not less than the second predefined value, or when the percentage of the edges of the image to the image is not greater than the third predefined value.

7. The method of claim 6, further comprising:
respectively applying weightings respectively to the average color difference, the gradient variation magnitude difference, and the percentage of the edges of the image to the image to calculate a weighted score; and
classifying the image according the weighted score.

8. The method of claim 1, further comprising:
calculating a percentage of edges of the image to the image;
determining the image is the landscape image when the gradient variation magnitude difference is less than the second predefined value and the percentage of the edges of the image to the image is greater than a third predefined value; and
determining the image is a close-up image when the gradient variation magnitude difference is not less than the second predefined value and the percentage of the edges of the image to the image is not greater than the third predefined value.

9. The method of claim 8, wherein the percentage of edge pixels in the image is calculated using the steps of:
detecting edge pixels in the image;
filtering the edge pixels according to a predefined threshold; and
calculating the percentage of the edges of the image to the image according to the number of the filtered edge pixels and the number of pixels of the image.

10. The method of claim 9, further comprising:
dividing the image into a plurality of blocks;
determining the respective block is an edge block when the block includes at least one of the edge pixels; and
calculating the percentage of the edges of the image to the image according to the number of the edge blocks and the number of the blocks of the image.

11. The device of claim 2, wherein the processing unit further calculates an average color difference between at least one average channel value of pixels in at least one boundary region of the image and a predefined standard value, determines the image is the landscape image when the average color difference is less than a first predefined value and the gradient variation magnitude difference is less than the second predefined value, and determines the image is the close-up image when the average color difference is not less than the first predefined value and the gradient variation magnitude difference is not less than the second predefined value.

12. The device of claim 11, wherein the processing unit calculates the average color difference by segmenting the image into a plurality of image regions, determining at least one boundary region from the image regions, wherein the at least one boundary region comprises an upper or lower boundary of the image, calculating at least one average channel value of pixels in the at least one boundary region, calculating a color difference between the average channel value of pixels in the respective boundary region and the predefined standard value, and calculating the average color difference according to the color differences corresponding to the at least one boundary region.

13. The device of claim 11, wherein the processing unit further calculates a percentage of the edges of the image to the image, determines the image is the landscape image when the average color difference is less than the first predefined value, the gradient variation magnitude difference is less than the second predefined value, and the percentage of the edges of the image to the image is greater than a third predefined value; and determines the image is the close-up image when the average color difference is not less than the first predefined value, the gradient variation magnitude difference is not less than the second predefined value and the percentage of the edges of the image to the image is not greater than the third predefined value.

14. The device of claim 13, wherein the processing unit calculates the percentage of edge pixels in the image by detecting edge pixels in the image, filtering the edge pixels according to a predefined threshold, and calculating the percentage of the edges of the image to the image according to the number of the filtered edge pixels and the number of pixels of the image.

15. The device of claim 14, wherein the processing unit further divides the image into a plurality of blocks, determines the respective block is an edge block when the block includes at least one of the edge pixels, and calculates the percentage of the edges of the image to the image according to the number of the edge blocks and the number of the blocks of the image.

16. The device of claim 13, wherein the processing unit further respectively applies a weighting to the average color difference, the gradient variation magnitude difference, and the percentage of the edges of the image to the image to calculate a weighted score, and classifies the image according the weighted score.

* * * * *